US009072076B2

(12) United States Patent
Hagerman et al.

(10) Patent No.: US 9,072,076 B2
(45) Date of Patent: Jun. 30, 2015

(54) METHOD FOR FAST ACKNOWLEDGEMENT AND IDENTIFICATION OF A SERVICE ACCESS REQUEST MESSAGE OR A PREAMBLE THEREOF

(75) Inventors: Bo Hagerman, Tyreso (SE); Fredrik Gunnarsson, Linkoping (SE); Thomas Ostman, Spanga (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 799 days.

(21) Appl. No.: 12/600,952

(22) PCT Filed: Oct. 26, 2007

(86) PCT No.: PCT/SE2007/000942
§ 371 (c)(1),
(2), (4) Date: Dec. 30, 2009

(87) PCT Pub. No.: WO2009/005417
PCT Pub. Date: Jan. 8, 2009

(65) Prior Publication Data
US 2010/0159970 A1 Jun. 24, 2010

(30) Foreign Application Priority Data
Jun. 29, 2007 (SE) ...................................... 0701588

(51) Int. Cl.
*H04B 7/00* (2006.01)
*H04W 74/00* (2009.01)
*H04L 1/16* (2006.01)
*H04W 74/08* (2009.01)

(52) U.S. Cl.
CPC ........... *H04W 74/008* (2013.01); *H04L 1/1607* (2013.01); *H04W 74/0833* (2013.01); *H04W 74/0866* (2013.01)

(58) Field of Classification Search
CPC .......... H04W 74/0866; H04W 74/008; H04W 74/0833; H04L 1/1607
See application file for complete search history.

(56) References Cited

U.S. PATENT DOCUMENTS

2001/0046864 A1* 11/2001 Bhatoolaul et al. ........... 455/442
2002/0114297 A1 8/2002 Karna et al.
(Continued)

FOREIGN PATENT DOCUMENTS

WO 9818280 A2 4/1998
WO 9941845 A1 8/1999
(Continued)

OTHER PUBLICATIONS

International Search Report for PCT/SE2007/000942, mailed Jun. 17, 2008.
(Continued)

*Primary Examiner* — Fanghwa Wang
(74) *Attorney, Agent, or Firm* — Patent Portfolio Builders PLLC

(57) ABSTRACT

A method is provided in a base station for handling a request from a first user equipment for accessing a service in a radio communications network. The method comprises the steps of receiving a first time interval of an incoming signal comprises a first signal sent from the first user equipment and a second signal sent from the second user equipment, interpreting the first signal as being a possible service access request message preamble, and sending an acknowledgement, that the preamble is detected, to the first user equipment. The method comprises the further steps of delaying the first time interval of the incoming signal, identifying the second signal in the first time interval of the incoming signal during the delay, washing the identified second signal away from the first time interval of the incoming signal during the delay, and deciding whether the possible preamble is a real preamble or not, by analyzing the washed incoming signal.

10 Claims, 4 Drawing Sheets

(56) References Cited

U.S. PATENT DOCUMENTS

| | | | |
|---|---|---|---|
| 2003/0223476 A1* | 12/2003 | Kanterakis et al. | 375/141 |
| 2004/0184421 A1 | 9/2004 | Hondo | |
| 2006/0154680 A1* | 7/2006 | Kroth et al. | 455/515 |
| 2006/0222096 A1* | 10/2006 | Guo et al. | 375/260 |
| 2006/0269024 A1* | 11/2006 | Dominique et al. | 375/350 |
| 2007/0004465 A1* | 1/2007 | Papasakellariou et al. | 455/571 |

FOREIGN PATENT DOCUMENTS

| | | | |
|---|---|---|---|
| WO | 2004004269 A1 | 1/2004 |
| WO | 2004049652 A1 | 6/2004 |
| WO | 2005057822 A1 | 6/2005 |
| WO | 2006107136 A1 | 10/2006 |
| WO | 2007049998 A1 | 5/2007 |
| WO | 2007068722 A1 | 6/2007 |

OTHER PUBLICATIONS

International Preliminary Report on Patentability for PCT/SE2007/000942, dated May 29, 2009.

Australian Office Action in corresponding Australian Patent Application No. 2007355920 dated Nov. 2, 2012.

English Translation of Taiwanese Office Action in corresponding Taiwan Patent Application No. 097118549 dated Jul. 18, 2013.

English Translation of Taiwanese Search Report in corresponding Taiwan Patent Application No. 097118549 dated Jul. 17, 2013.

Supplementary European Search Report dated Jun. 13, 2011 in corresponding European Patent Application No. 07835142.6.

3GPP, "3rd Generation Partnership Project; Technical Specification Group Radio Access Network; Physical channels and mapping of transport channels onto physical channels (FDD) (Release 7)", 3GPP TS 25.211 v7.0.0, Technical Specification, Mar. 2006.

3GPP, "3rd Generation Partnership Project; Technical Specification Group Radio Access Network; Physical layer procedures (FDD) (release 7)", 3GPP TS 25.214 v7.3.0, Technical Specification, Dec. 2006.

3GPP, "3rd Generation Partnership Project; Technical Specification Group Radio Access Network; UTRAN lub interface Node B Application Part (NBAP) signalling (release 7)", 3GPP TS 25.433 v7.3.0, Dec. 2006.

* cited by examiner

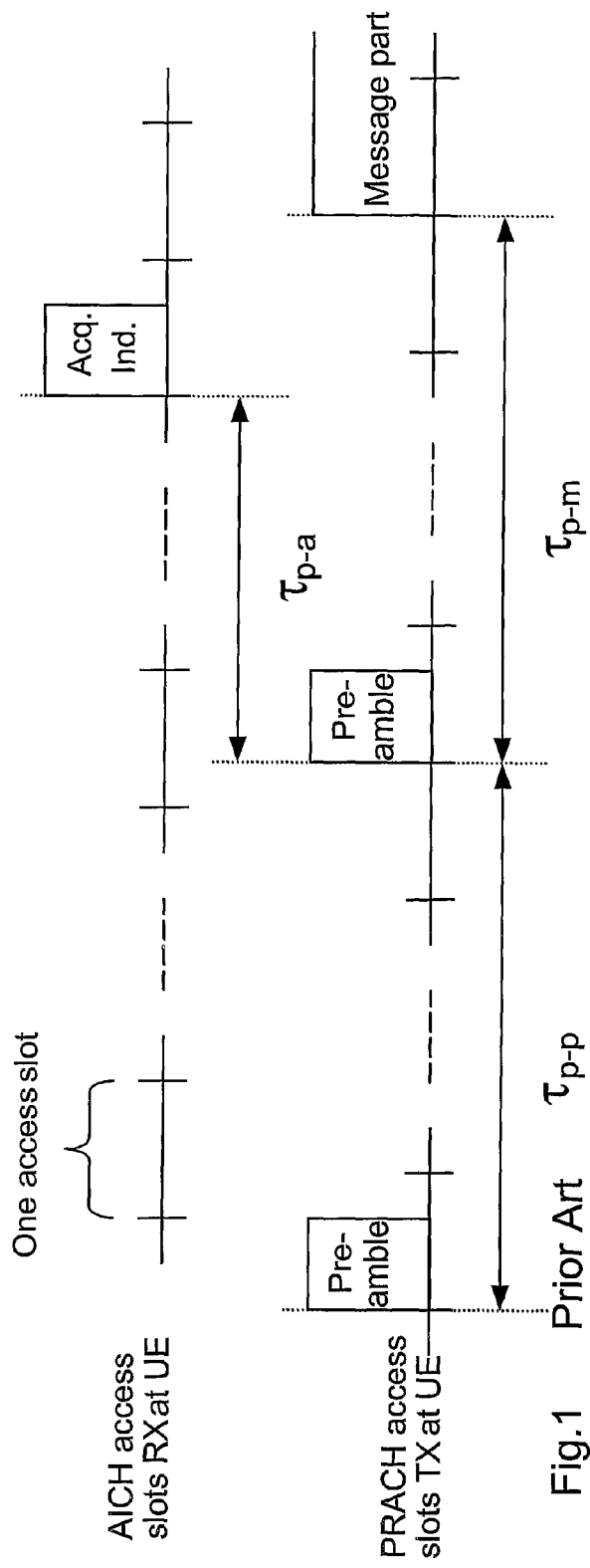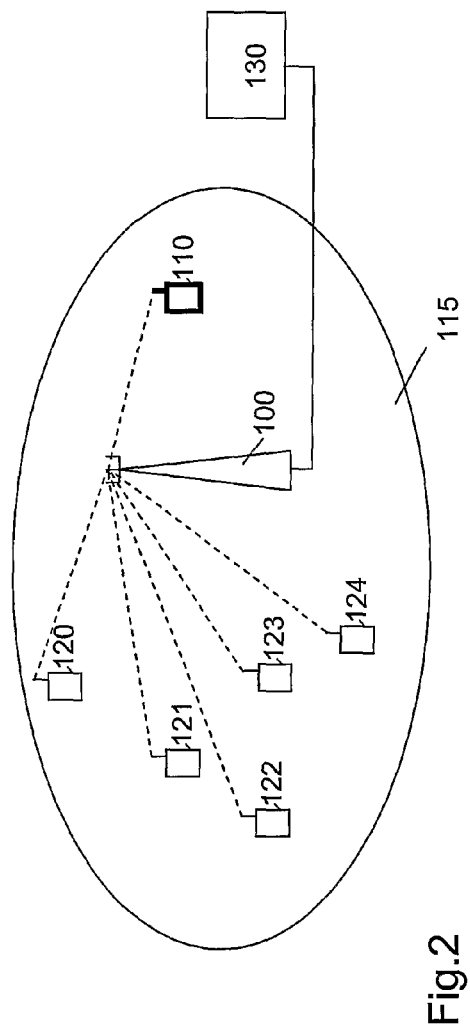
Fig.1 Prior Art
Fig.2

METHOD FOR FAST ACKNOWLEDGEMENT AND IDENTIFICATION OF A SERVICE ACCESS REQUEST MESSAGE OR A PREAMBLE THEREOF

RELATED APPLICATIONS

This application claims priority and benefit from International Application No. PCT/SE2007/000942, filed Oct. 26, 2007, which claims priority to Swedish patent application No. 0701588-6, filed Jun. 29, 2007, the entire teachings of which are incorporated herein by reference.

TECHNICAL FIELD

The present invention relates generally to a method and an arrangement in a base station in a radio access network. In particular it relates to the handling of a request from a user equipment for accessing a service in a radio communications network.

BACKGROUND

In a common radio network architecture a user equipment may be a mobile terminal by which a subscriber can access services offered by an operator's core network. A radio access network is the part of the network that is responsible for the radio transmission and control of the radio connection. A radio network subsystem controls a number of base stations in the radio access network. A radio network controller controls radio resources and radio connectivity within a set of cells. The base station handles the radio transmission and reception within one or more cells. A cell covers a geographical area. The radio coverage in a cell is provided by radio base station equipment at the base station site. Each cell is identified by a unique identity, which is broadcast in the cell. There may be more than one cell covering the same geographical area. A radio link is a representation of the communication between a user equipment and one cell in the radio access network. Iub/Iur interfaces are interfaces connecting the different nodes in the radio access network. The Iub interface interconnects the radio network controller to the base station. The Iur interface provides interconnection between one radio network controller and another. User data is transported on so-called transport bearers on these interfaces. Dependant on the transport network used, these transport bearers may e.g. be mapped to ATM Adaptation Layer type 2 (AAL2) connections in case of an Asynchronous Transfer Mode (ATM) based transport network or User Datagram Protocol (UDP) connections in case of an Internet Protocol IP based transport network.

A user equipment in an idle state monitors system information of base stations within range, to inform itself about candidate base stations in the service area etc. When a user equipment needs access to services, it sends a request over the Random Access CHannels (RACH) to a radio network controller via the most suitable base station, typically the one with the most favourable radio conditions. This is performed in two steps, first a preamble of the request is sent and when acknowledged by the base station, the request message is sent. Since the uplink propagation of the RACH is only approximately known, the user equipment gradually increases the transmission power of a preamble until either it has been acknowledged via the Acquisition channel AICH, or the maximum number of attempts has been reached. The preamble and the request message is sent via the base station to the radio network controller. Upon acknowledgement, the RACH request message is sent. After admission control, the radio network controller initiates the connection via the most suitable base station if there are available resources. Uplink coverage is thus a necessity in order to successfully complete random access. The downlink AICH is commonly divided into downlink access slots, and each access slot is of length 5120 chips. Similarly, the uplink PRACH is divided into uplink access slots, each access slot is of length 5120 chips. Uplink access slot number n is transmitted from the user equipment $\tau_{p-a}$ chips prior to the reception of downlink access slot number n, n=0, 1, . . . , 14.

Transmission of downlink acquisition indicators may only start at the beginning of a downlink access slot. Similarly, transmission of uplink RACH preambles and RACH message parts may only start at the beginning of an uplink access slot. FIG. 1 depicts the timing relation between physical RACH and AICH as seen at the user equipment according to prior art. The preamble-to-preamble timing distance $\tau_{p-p}$ shall be larger than or equal to the minimum preamble-to-preamble.

$\tau_{p-p,min}$, i.e. $\tau_{p-p} \geq \tau_{p-p,min}$.

In addition to $\tau_{p-p,min}$, the preamble-to-Acquisition distance $\tau_{p-a}$ and preamble-to-message distance $\tau_{p-m}$ may be defined as follows:

when AICH Transmission Timing is set to 0, then
$\tau_{p-p,min}$=15360 chips (3 access slots)
$\tau_{p-a}$=7680 chips
$\tau_{p-m}$=15360 chips (3 access slots)
when AICH Transmission Timing is set to 1, then
$\tau_{p-p,min}$=20480 chips (4 access slots)
$\tau_{p-a}$=12800 chips
$\tau_{p-m}$=20480 chips (4 access slots)
The parameter AICH Transmission Timing is signalled by higher layers.

The preamble is detected using energy detection relative a preamble threshold, which may be configured from the radio network controller to the base station over Node B Application Part (NBAP). A too low threshold would mistakenly trigger preambles from thermal noise, interference by others and similarly, a too high threshold will trigger preambles at very high power levels, or miss preambles all together. The threshold needs to be set considering the worst case uplink load situation.

Uplink Radio Resource Management (RRM)

The radio network controller may control resources and user mobility such as in 3GPP release 99. Resource control in this framework means admission control, congestion control, channel switching (roughly changing the data rate of a connection). Furthermore, a dedicated connection is carried over a Dedicated CHannel (DCH), which is realized as a DPCCH (Dedicated Physical Control Channel) and a DPDCH (Dedicated Physical Data Channel).

The trend is to decentralize decision making, and in particular the control over the short term data rate of the user connection. The uplink data may then be allocated to a Enhanced DCH (E-DCH), which is realized as the triplet: a DPCCH, which is continuous, an Enhanced DPCCH (E-DPCCH) for data control and an Enhanced DPDCH (E-DPDCH) for data. The two latter are only transmitted when there is uplink data to send. Hence the base station uplink scheduler determines which transport formats each user can use over E-DPDCH. The radio network controller is however still responsible for admission control. In the Wideband Code Division Multiple Access (WCDMA) uplink, there is a trade-off between coverage and enabled peak rates. This is even more emphasized with enhanced uplink, which supports higher bit rates than ordinary dedicated channels. The uplink resources are limited by the thermal noise and interference, i.e. rise over thermal (RoT) that the cell can tolerate. The RoT limit is either motivated by coverage requirements or power control stability requirements. When only one user is connected in the cell, both power control stability and coverage are minor issues, since the uplink interference is likely to be dominated by the power generated by this user. In such a case it is tempting to allow a high RoT in order to allow high signal level over the noise (Ec/Io), which enables the use of high uplink bit rates. Conversely, in order to use the high uplink bit rates, the user connections have to provide high Ec/Io, which implies high RoT.

Cells operating at high RoT will have limited coverage, and it might be impossible to successfully complete random access from some parts of the service areas. The RACH preamble will not be detected by the system at these high RoT when sent from parts of the service area. Furthermore, the gradual power increase may generate significant interference, which could have a negative impact on the data rate of the active user. Neither is it possible to lower the preamble threshold because this will lead to many erroneous preamble detections from only thermal noise and/or interference from other users which will give unnecessary Iub transmissions of subsequent RACH messages.

this will in many cases result in subsequent RACH transmissions at too low power levels, which will not be decoded correctly.

Moreover, the short time between a received preamble and when an acquisition indicator is expected means that it is very limited time for processing before it has to be determined whether a preamble was sent at a sufficient power level.

SUMMARY

It is therefore an object of the present invention to provide a mechanism for improving access to a service in a radio communications network.

According to a first aspect of the present invention, the object is achieved by a method in a base station for handling a request from a first user equipment for accessing a service in a radio communications network. The base station communicates with second user equipment over a radio link. The method comprises the steps of receiving a first time interval of an incoming signal, which incoming signal comprises a first signal sent from the first user equipment and a second signal sent from the second user equipment, interpreting the first signal as being a possible service access request message or a preamble thereof, and sending an acknowledgement, that the possible service access request message or preamble thereof is detected, to the first user equipment. The method comprises the further steps of delaying the first time interval of the incoming signal, identifying the second signal in the first time interval of the incoming signal during the delay, washing the identified second signal away from the first time interval of the incoming signal during the delay, and deciding whether the possible service access request message or the preamble thereof is a real service access request message or a preamble thereof or not, by analysing the washed incoming signal.

According to a second aspect of the present invention, the object is achieved by an arrangement in a base station. The base station is adapted to communicate with the first user equipment and a second user equipment over a radio link. The base station arrangement comprises a receiving unit adapted to receive a first time interval of an incoming signal in. The incoming signal comprises a first signal sent from the first user equipment and a second signal sent from the second user equipment. The receiving unit is further adapted to interpret the first signal as being a service access request message or a preamble thereof. The base station arrangement further comprising a sending unit adapted to send an acknowledgement that the possible a service access request message or preamble thereof is detected to the first user equipment and a processing unit adapted to delaying the first time interval of the incoming signal. The processing unit further comprises an identifying unit being adapted to identify the second signal in the first time interval of the incoming signal during the delay and a washing unit adapted to wash the identified second signal away from the first time interval of the incoming signal during the delay. The processing unit further comprises an analysing unit being adapted to decide whether the possible service access request message or preamble thereof is a real service access request message or a preamble thereof, or not, by analysing the washed incoming signal.

Since an acknowledgement that the possible preamble is detected, is sent to the first user equipment which triggers the first user equipment to send the message associated to the preamble, and since in the mean time, the identified second signal is washed away from the first time interval of the incoming signal and it is decided whether the possible preamble is a real preamble or not, by analysing the washed incoming signal, the radio network controller will receive a message that is more possible to be real from the base station and the process is for accessing is faster. Thus access to a service in a radio communications network is improved.

An advantage of the present invention is that the dedicated cancellation of interference before detecting random access bursts will improve random access success probability at high uplink load. Combined conventional and refined preamble detection enables the use of lower preamble thresholds, which means that the user equipment will use lower power levels, avoiding to generating excessive uplink interference, reducing uplink capacity.

A further advantage of the present invention is that with interference cancellation, the preamble detection performance will be less dependent on uplink load, which will reduce the cell-breathing impact on the random access in WCDMA.

A yet further advantage of the present invention is that automatic adjustments of the preamble threshold enable the adaptation of the random access to the cancellation performance. With an adequate cancellation policy, the random access will achieve loaded network coverage comparable to the coverage of a noise-limited network.

Another advantage is that the erroneous RACH messages sent in vain over Iub can be reduced to a minimum, since the random access success rate is evaluated in the base station.

BRIEF DESCRIPTION OF THE DRAWINGS

FIG. 1 is a schematic block diagram depicting a timing relation between PRACH and AICH as seen at the user equipment according to prior art FIG. 2 is a schematic block diagram illustrating embodiments in a radio access network.

DETAILED DESCRIPTION

Figure 3:
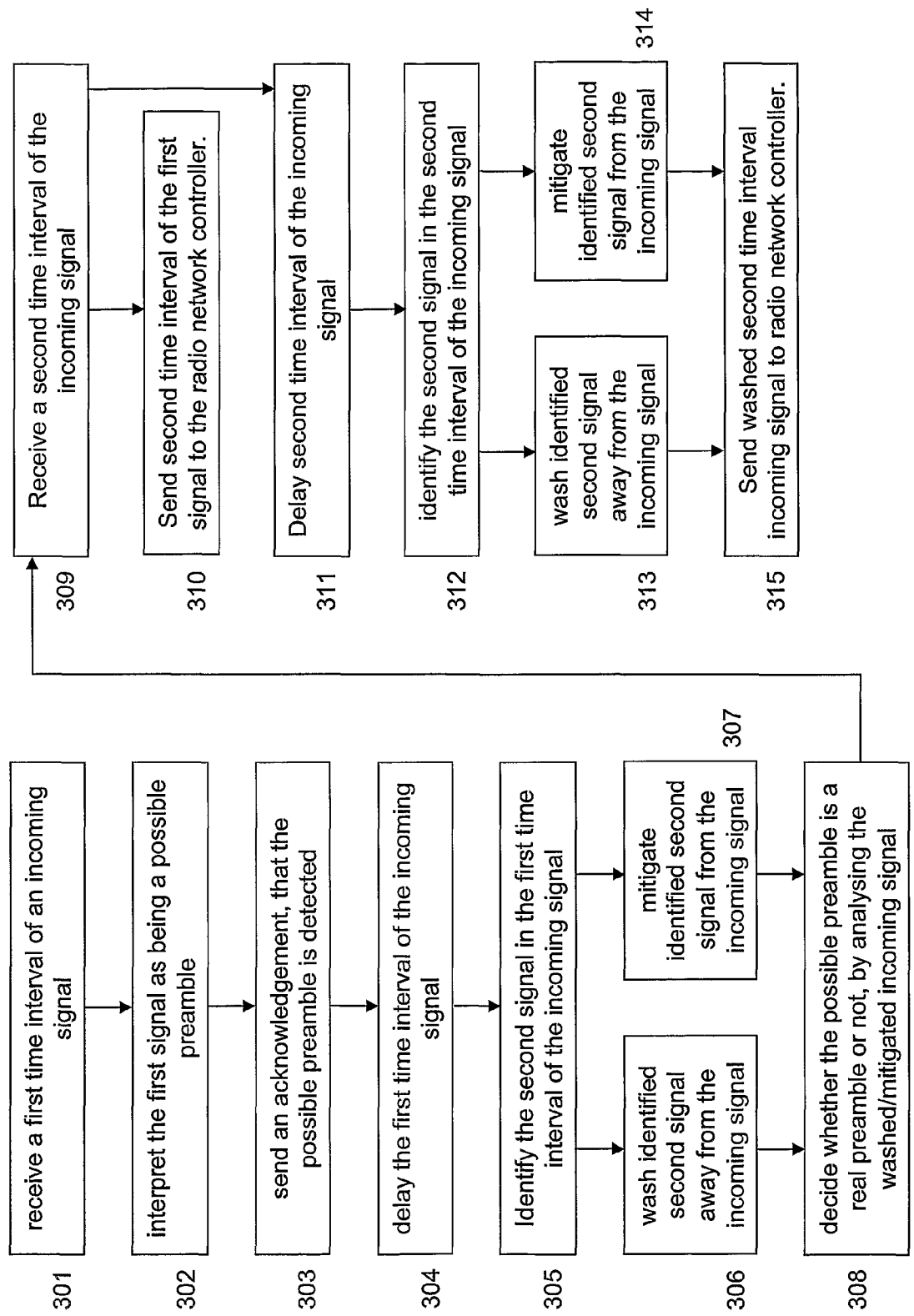
FIG. 3 is a flow chart illustrating a embodiments of method steps in a base station.

The invention is defined as a method and an arrangement which may be put into practice in the embodiments described below.

FIG. 2 depicts a base station 100 and a first user equipment 110 in a radio access network being comprised in a radio communications network. The radio access network is any network using access protocol, i.e. radio access networks using technologies such as e.g. E-UTRA, Worldwide Interoperability for Microwave Access (WiMAX), UTRAN, WCDMA, GSM/GPRS, Frequency Division Duplex (FDD), Orthogonal Frequency-Division Multiplexing (OFDM), Third Generation Partnership Project (3GPP) Long Term Evolution (LTE) etc. The base station 100 may be any suitable radio base station that can communicate with user equipments using radio communication, such as e.g. an eNode-B or Node-B. The first user equipment 110 is located within a cell 115 being served by the base station 100. The base station 100 communicates with at least one second user equipment over a radio link. In the example depicted in FIG. 2, the base station 100 communicates with five second user equipments 120, 121, 122, 123 and 124. The first user equipment 100 and the second user equipments 120, 121, 122, 123 and 124 may be any suitable radio communication device such as a laptop, a computer, a mobile phone, a Personal Digital Computer (PDA), or any other radio communication device that can communicate with base stations using radio communication. The at least one second user equipments 120, 121, 122, 123 and 124 are also located within the cell 115, served by the base station 100.

In order to allow high bit rates and operating at high rise over thermal levels, the coverage needs to be ensured. One important component is therefore to ensure that the random access can be successfully completed in the entire service area.

In some embodiments when the first user equipment 110 wishes to access a service in the radio communications network, it first sends a preamble of a service access request message such as e.g. a RACH preamble, over a random access channel such as e.g. RACH, via the base station 100 to a radio network controller 130 associated to the base station 100. Since the uplink propagation of the random access channel is only approximately known, the first user equipment 110 attempts sending the preamble and gradually increases the transmission power of the preamble for each attempt until either it has been acknowledged via an acquisition channel such as e.g. AICH, or a predetermined maximum number of attempts have been reached. When the first user equipment 110 has received an acknowledgement that the preamble is detected, it stops the attempts of sending the preamble. In some embodiments the first user equipment 110 then sends the service access request message such as e.g. a RACH message via the base station 100 to the radio network controller 130. In some embodiments the service request message without sending any preamble first.

The present method steps in the base station 100 for handling a request from the first user equipment 110 for accessing a service in a radio communications network will now be described with reference to a flow chart depicted in FIG. 3. The method comprises the steps of:

301. The base station 100 receives a first time interval of an incoming signal. The first time interval of the incoming signal comprises a first signal sent from the first user equipment 110. The signal further comprises at least one second signal, sent from the respective at least one second user equipments 120, 121, 122, 123 and 124.

302. The base station 100 detects the first signal among the second signals and interprets the first signal as being a possible service access request message from the first user equipment 110. It may be a possible complete service access request message or just a part of a service access request message such as a possible preamble of a service access request message. In this example a preamble of a service access request message is detected. The first signal has a specific energy. The first signal may be interpreted as a possible preamble when the specific energy exceeds a predetermined first threshold value. This first threshold value may preferably be lower than conventional threshold values, which means that the probability the preamble really is a preamble is also lower. A RACH message or similar service request message will however not be forwarded to the radio network controller 130 yet. The possible service request message or preamble thereof will be checked again by further processing later in the method. If the first threshold value is that low, the radio network controller 130 should be drowned in possible RACH messages with low possibility being a real message.

303. When the base station 100 has detected the possible service request message or preamble thereof it sends an acknowledgement that the possible service request message or preamble thereof is detected to the first user equipment 110. This will trigger the first user equipment 110 to stop the attempts to send the service request message or preamble thereof and to send the next part of the service access request message. This step is performed even if the possible service request message or preamble thereof has a low possibility being a real service request message or preamble thereof since it saves time and the process at the user equipment 110 can continue while the possible service request message or preamble thereof will be further processed in the base station 100 in a later step in this method.

304. In the base station 100, preferably in the receiver of the base station, the first time interval of the incoming signal is delayed. This is for performing processing of the first time interval of the incoming signal.

305. During the delay the at least one second signal is identified in the first time interval of the incoming signal. If the incoming signal comprises only one second signal, only that second signal is identified. If the incoming signal comprises more than one, such as e.g. five second signals one, from each of the second user equipments 120, 121, 122, 123 and 124 as in the example depicted in FIG. 2, one after one of all the second signals may be identified. In some embodiments only the strongest second signal or the three (or any other predetermined number) strongest second signals are identified.

306. Also during the delay, the identified second signal or signals are washed or mitigated away from the first time interval of the incoming signal. I.e. the interference caused by the second signal or signals is cancelled using an interference washer. This makes the first time interval of the incoming signal clean from the washed second signals. The procedure for this will be described more in detail below.

307. In some embodiments the step of washing the identified second signal or signals away from the first time interval of the incoming signal is replaced by this step of mitigating the identified second signal away from the first time interval and/or second time interval of the incoming signal.

308. In this step it is decided whether the possible preamble is a real preamble or not, by analysing the washed or mitigated incoming signal. In some embodiments the possible service access request message is decided to be a real service access request message in the analysis when the specific energy of the first signal exceeds a predetermined second threshold value. This second threshold value may be considerable lower than the first threshold value since the incoming signal is washed a great deal of interference noise thereby is removed, making the signal quality substantially improved. This is advantageous since a low threshold value increases the probability to make a right decision that the possible preamble of, or part of a service access request message or the service access request message is a real preamble of, or part of a service access request message or the service access request message.

309. When the user equipment 110 has received an acknowledgement that the preamble of, or part of a service access request message is identified, it sends the service access request message associated to the preamble or second part of service access request message associated to the first part of the service access request message (further on mentioned as the access request message associated to the preamble) to the base station 100. The base station 100 receives a second time interval of the incoming signal, which second time interval of the incoming signal comprises a second time interval of the first signal sent from the first user equipment 110 and a second time interval of the second signal sent from the second user equipment 120, 121, 122, 123, 124. The second time interval of the first signal consequently comprises the service access request message associated to the preamble, which preamble was sent in the first time interval.

310. The Base station 100 may send the second interval of the first signal, comprising the service access request message associated to the preamble, to the radio network controller without any further processing.

311. As a preferably alternative to step 310 the second interval of the first signal is processed, starting with a delay of the second time interval of the incoming signal.

312. The one or more, or at least some of the second signals are then identified in the second time interval of the incoming signal during the delay. This may be performed in the same way as in step 305.

313. During the delay, the identified second signal or signals are washed or mitigated away from the second time interval of the incoming signal. This may be performed in the same way as in step 306.

314. In some embodiments, the step of washing the identified second signal or signals away from the first time interval of the incoming signal is replaced by this step of mitigating the identified second signal away from the first time interval and/or second time interval of the incoming signal.

315. The washed or mitigated second time interval of the incoming signal, comprising the service access request message associated to the preamble, is then sent to the radio network controller 130.

In some embodiments the steps of washing or mitigating the plurality of second signals away from the first time interval and/or second time interval of the incoming signal, at least one second signal of the plurality of second signals of the second signal is washed or mitigated away from the first time interval and/or second time interval of the incoming signal. In some embodiments, the decision of which at least one second signal of the plurality of second signals that shall be washed or mitigated away is determined is based on a quality value obtained from a receiver in the base station 100 indicating the accuracy of detected symbols and channel estimates.

As mentioned above, the base station 100 may communicates with a plurality of second user equipments 120, 121, 122, 123, 124 over the radio link as depicted in FIG. 2. In that case the first time interval and/or second time interval of the incoming signal further may comprise a plurality of second signals, one second signal sent from each of the respective plurality of second user equipments 120, 121, 122, 123, 124. The plurality of second signals are identified out of the first time interval and/or second time interval of the incoming signal during the delay in the steps of identifying the second signal. The identified second signals may then be washed or mitigated away from the first time interval and/or second time interval of the incoming signal during the delay in the steps of washing or mitigating the second signal away from the first time interval and/or second time interval of the incoming signal.

Figure 4:
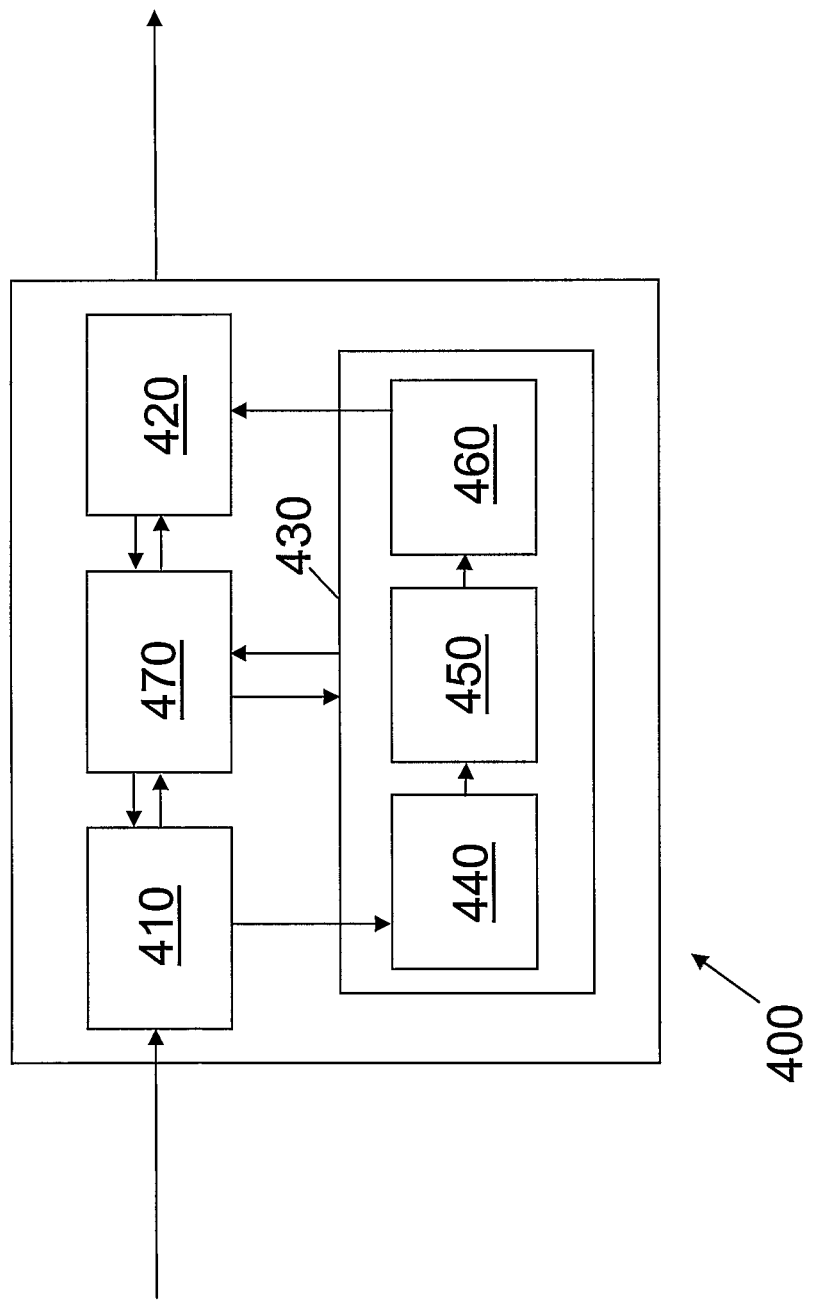
FIG. 4 is a schematic block diagram illustrating embodiments of a receiver structure.

To perform the method steps for handling a request from a first user equipment 110 for accessing a service in a radio communications network, the base station 100 comprises an arrangement 400 depicted in FIG. 4.

The base station arrangement 400 comprises a receiving unit 410 adapted to receive the first time interval of an incoming signal in. The incoming signal comprises the first signal sent from the first user equipment 110 and the second signal sent from the second user equipment 120, 121, 122, 123, 124. The receiving unit 410 is further adapted to interpret the first signal as being a service access request message or a preamble thereof.

In some embodiments, the first signal is interpreted as being a preamble of a service access request message. In these embodiments, the receiving unit 410 further may be adapted to receive a second time interval of the incoming signal. The second time interval of the incoming signal comprises a second time interval of the first signal sent from the first user equipment 110 and a second time interval of the second signal sent from the second user equipment 120, 121, 122, 123, 124. The second time interval of the first signal comprises the service access request message associated to the preamble sent in the first time interval.

The base station arrangement 400 further comprises a sending unit 420 adapted to send an acknowledgement that the possible preamble is detected to the first user equipment 110.

The base station arrangement 400 further comprises a processing unit 430 adapted to delaying the first time interval of the incoming signal. The processing unit 430 may further be adapted to delay the second time interval of the incoming signal.

The processing unit 430 comprises an identifying unit 440 being adapted to identify the second signal in the first time interval of the incoming signal during the delay. The identifying unit 440 may further be adapted to identify the second signal in the second time interval of the incoming signal during the delay.

The processing unit 430 further comprises a washing unit 450 adapted to wash the identified second signal away from the first time interval of the incoming signal during the delay. The washing unit 450 may further be adapted to wash the identified second signal away from the second time interval of the incoming signal during the delay.

The processing unit 430 further comprises an analysing unit 460 being adapted to decide whether the possible service access request message is a real service access request message or not, by analysing the washed incoming signal.

The sending unit 420 may further be adapted to send the washed second interval of the first signal, comprising the service access request message associated to the preamble, to the radio network controller 130.

Figure 5:
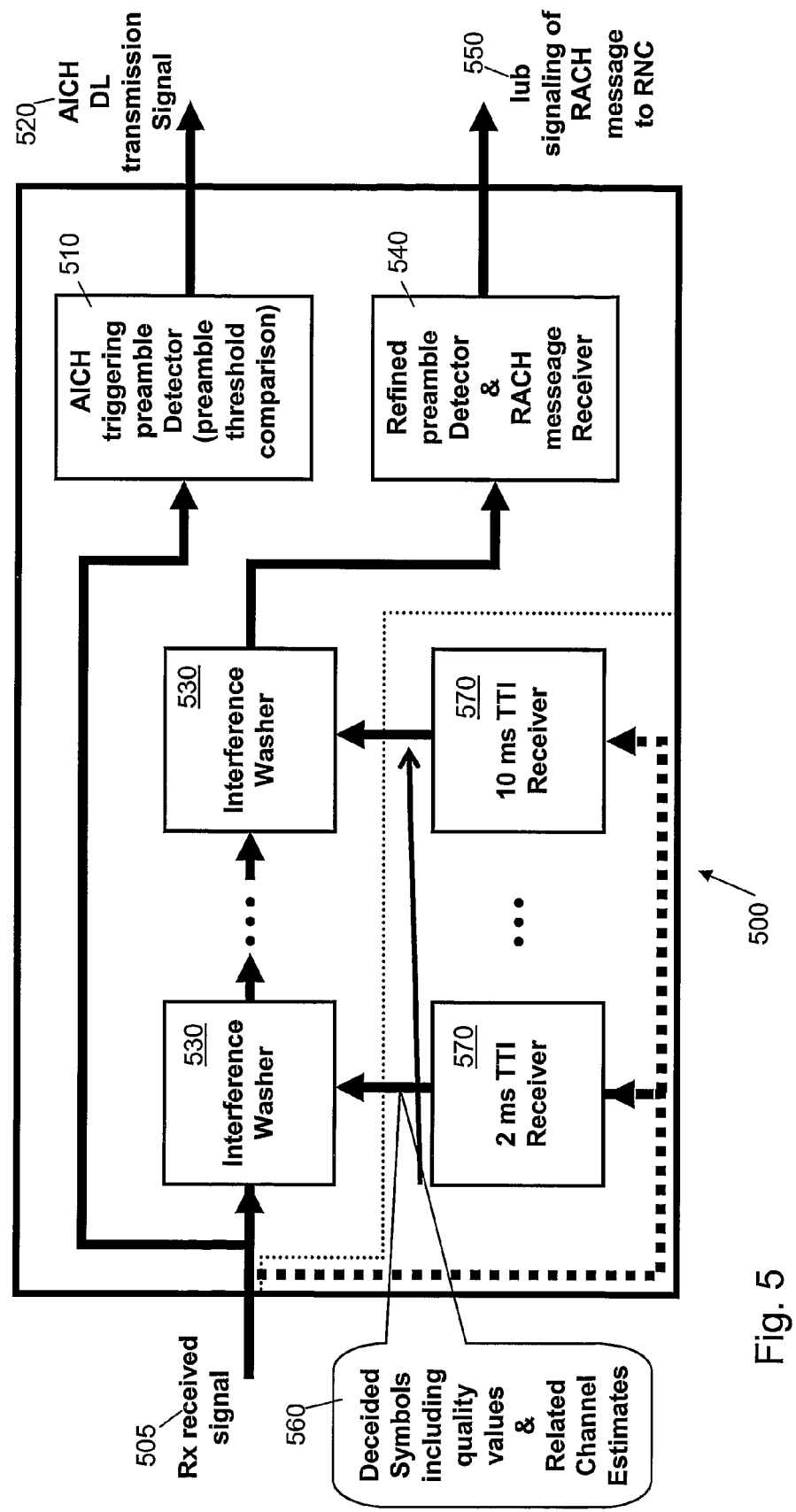
FIG. 5 is a schematic block diagram illustrating embodiments of an interference washer structure.

FIG. 5 illustrates an example of a structure of a RACH receiver 500 in the base station 100, which RACH receiver structure 500 utilizes interference washers. In order to support acquisition indications over AICH shortly after a detected preamble of a received signal 505 in an incoming signal as may be requested by timing requirements, the preamble is detected 510 e.g. by using a preamble threshold as mentioned in step 302, and an acquisition indication may be sent 520 over AICH to the user equipment 110 as mentioned in step 303. In parallel, the preamble soft information is stored, i.e. the incoming signal is delayed as mentioned in step 304, and interference may be cancelled using interference washers 530 as mentioned in step 306. At a later stage after interference cancellation, the preamble can be evaluated again in a refined preamble detector as mentioned in step 308. Furthermore, the RACH message may also be stored and decoded 540 after interference cancellation as mentioned in step 311 and may further be sent 550 to the radio network controller 130.

The cancellation, i.e. washing stages may use decided symbols, channel estimates and or quality values/estimates 560 from multiple receivers 570 either situated in the same processing unit or in different processing units. Similarly, the cancellation stages may use completely regenerated signals or other information formats from the receivers. Furthermore, it may be sufficient to cancel one of the second user signals, such as e.g. the E-DCH, which most probably dominates the uplink RoT.

In some of the embodiments, the cancellation may utilize an interference washer wherein the regenerated signals are adequately delayed in order to be synchronized to the received signal. This results in a more proper operation. The washer may employ partial cancellation meaning that only a fraction of the regenerated interference is cancelled. This may be based on a quality value obtained from the receiver indicating the accuracy of the detected symbols and the channel estimates, i.e. the expected correctness probability of the regenerated signal.

In some embodiments, the preamble detection is facilitated by cancelling intra-cell interference before detection, i.e. the refined preamble detection is always used when detecting preambles. This means that e.g. the RACH sub-channels needs to be recorded and post-processed in which stage intra-cell interference is cancelled. This means that sufficient time intervals need to be employed before signalling the detection result over AICH. The possibilities to complete this task may be very limited for a general connection in the same cell. However, for e.g. E-DCH, with high data rates and short TTI's of 2 ms, it may be possible to have time for cancellation before detection has to be performed.

In one embodiment it could be of interest to only perform cancellation of e.g. the RACH message part, while the preamble is detected without cancelled interference. In such a case the power offset Pp-m between the last preamble power and the power of the RACH message part can be reduced, and the maximal power allowed for the preamble can be higher than normal.

The required preamble threshold may depend on the cancellation performance, which may vary over time and between radio base stations. In an exemplifying embodiment, this preamble threshold is therefore adjusted based on detection statistics. Such statistics may be obtained by comparing the results from the preamble detector and the refined preamble detector, and by storing the RACH message error rate. Based on target values for RACH message error rate and preamble false detection rate, the preamble threshold is adapted. It is increased if the RACH message error rate is higher than desired, and it is also increased if the preamble false detection rate is higher than required. Moreover, the threshold may be decreased if these measures show too conservative preamble detection.

The internal adjustments of the preamble threshold in the radio base station mean that the actual preamble threshold configured by the radio network controller is altered. In this way, radio base stations which are not capable of cancelling interference to facilitate random access can use the configured preamble threshold from the radio network controller, while more advanced radio base stations may adjust the threshold to adapt to the cancellation performance.

The motivating example is WCDMA, but the invention is generally applicable to other wireless systems utilizing alternative radio interfaces.

The present mechanism for predicting interference contribution may be implemented through one or more processors, such as a processor 470 in the base station arrangement 400 depicted in FIG. 4, together with computer program code for performing the functions of the present solution. The program code mentioned above may also be provided as a computer program product, for instance in the form of a data carrier carrying computer program code for performing the present solution when being loaded into the base station 100. One such carrier may be in the form of a CD ROM disc. It is however feasible with other data carriers such as a memory stick. The computer program code can furthermore be provided as pure program code on a server and downloaded to the base station 100 remotely.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method in a base station for handling a request from a first user equipment to a radio network controller, for accessing a service in a radio communications network, the base station also communicating with a second user equipment over a radio link, the method comprising the steps of:
   receiving a first portion of an incoming signal, the first portion comprising a first signal sent from the first user equipment and a second signal sent from the second user equipment,
   detecting the first signal as being a possible service access request message or a preamble thereof if a first specific energy of the first signal exceeds a first threshold value;
   sending an acknowledgement, that the possible service access request message or the preamble thereof has been detected, to the first user equipment;
   intentionally delay sending the first portion of the incoming signal to the radio network controller associated with the base station;
   identifying the second signal in the first portion of the incoming signal while the sending of the first portion is delayed;
   washing the first portion of the incoming signal by cancelling the identified second signal from the first portion of the incoming signal while the sending of the first portion is delayed; and
   deciding whether the first signal is a real service access request message or a preamble thereof, or not, by comparing a second specific energy of the first signal in the washed first portion of the incoming signal with a second threshold value that is lower than the first threshold value,
   wherein the acknowledgement is sent to the first user equipment before deciding whether the first signal is the real service access request message or the preamble thereof, or not.

2. The method according to claim 1, wherein the first and/or second threshold value are adjusted based on detection statistics.

3. The method according to claim 1, further comprising:
   receiving a second portion of the incoming signal, the second portion comprising a third signal sent from the first user equipment and a fourth signal sent from the second user equipment, the third signal being related to the first signal received in the first time interval, and forwarding the second portion of the incoming signal, to the radio network controller, wherein the third signal is a service access request.

4. The method according to claim 1, further comprising:
receiving a second portion of the incoming signal, the second portion comprising a third signal sent from the first user equipment and a fourth signal sent from the second user equipment, the third signal being related to the first signal and comprising a service access request message;

delay sending the second portion of the incoming signal to the radio network controller associated with the base station;

identifying the fourth signal in the second portion of the incoming signal while the sending of the second portion is delayed;

washing the second portion of the incoming signal by cancelling the identified fourth signal from the second portion of the incoming signal while the sending of the second time interval is delayed; and sending the washed second portion of the incoming signal, comprising the third signal, to the radio network controller.

5. The method according to claim 1, wherein the base station communicates with a plurality of second user equipments over the radio link, the method further comprising:

receiving a second portion of the incoming signal comprising a third signal sent from the first user equipment and a plurality of fourth signals; and delay sending the second portion of the incoming signal to the radio network controller, wherein the first portion of the incoming signal further comprises a plurality of second signals, each of the second signals and each fourth signals being sent from one of the respective plurality of second user equipments, and wherein the plurality of second signals and the plurality of fourth signals are identified in the first portion and in the second portion of the incoming signal while sending of the second portion is delayed; and wherein the plurality of second signals are cancelled away from the first portion and the plurality of fourth signals are cancelled away from the second portion of the incoming signal while sending the first portion and of the second portion to the radio controller are delayed, respectively.

6. The method according to claim 4, wherein the step of washing the second signal away from the first portion of the incoming signal and/or washing the fourth signal away from the second portion of the incoming signal is replaced by a step of mitigating the second signal and/or the fourth signal away from the first portion of the incoming signal and/or from the second portion of the incoming signal.

7. The method according to claim 5, wherein in the step of washing the second signals away from the first portion of the incoming signal and/or washing the fourth signals away from the second portion of the incoming signal, at least one of the second signals is mitigated away from the first portion of the incoming signal, and/or at least one of the fourth signals is mitigated away from the second portion of the incoming signal.

8. The method according to claim 7, wherein which the at least one of the second signals to be washed or mitigated away is determined, based on a quality value obtained from a receiver in the base station indicating an accuracy of detected symbols and channel estimates.

9. An arrangement in a base station, for handling a request from a first user equipment to a radio network controller for accessing a service in a radio communications network, the base station being adapted to communicate with the first user equipment and a second user equipment over a radio link, the base station arrangement comprises:

a receiving unit adapted to receive a first portion of an incoming signal wherein said first portion comprises a first signal sent from the first user equipment and a second signal sent from the second user equipment, the receiving unit further being adapted to interpret the first signal as being a possible service access request message or a preamble thereof if a first specific energy of the first signal exceeds a first threshold value;

a sending unit adapted to send an acknowledgement that the possible service access request message or preamble thereof has been detected to the first user equipment; and a processing unit adapted to intentionally delay sending the first portion of the incoming signal to the radio network controller associated with the base station, the processing unit comprising:

an identifying unit being adapted to identify the second signal in the first portion of the incoming signal while sending the first portion is delayed;

a washing unit adapted to wash the first portion of the incoming signal by cancelling the identified second signal from the first portion of the incoming signal while sending the first portion is delayed; and an analyzing unit being adapted to decide whether the first signal is a real service access request message or a preamble thereof, or not, by comparing a second specific energy of the first signal in the washed first portion of the incoming signal with a second threshold value that is lower than the first threshold value, wherein the sending unit sends the acknowledgement before the analyzing unit decides whether the first signal is the real service access request message or the preamble thereof, or not.

10. The base station arrangement of claim 9, wherein the receiving unit is further adapted to receive a second portion of the incoming signal, wherein said second portion of the incoming signal comprises a third signal sent from the first user equipment and a fourth signal sent from the second user equipment, which third signal is related to the first signal and comprises a service access request message, the processing unit is further adapted to delay sending the second portion of the incoming signal to the radio network controller, the identifying unit is further adapted to identify the fourth signal in the second portion of the incoming signal while sending the second portion of the incoming signal is delayed, the washing unit is further adapted to wash the second portion of the incoming signal by cancelling the identified fourth signal from the second portion of the incoming signal while the sending of the second portion of the incoming signal is delayed, and the sending unit is further adapted to send the washed second portion of the incoming signal, comprising the third signal, to the radio network controller.

* * * * *

UNITED STATES PATENT AND TRADEMARK OFFICE
CERTIFICATE OF CORRECTION

PATENT NO.        : 9,072,076 B2
APPLICATION NO.   : 12/600952
DATED             : June 30, 2015
INVENTOR(S)       : Hagerman et al.

Page 1 of 1

It is certified that error appears in the above-identified patent and that said Letters Patent is hereby corrected as shown below:

In the specification

In Column 5, Lines 50-51, delete "message" and insert -- message is sent --, therefor.

Signed and Sealed this
Twenty-ninth Day of December, 2015

Michelle K. Lee
*Director of the United States Patent and Trademark Office*